(12) United States Patent
Baurer et al.

(10) Patent No.: US 11,944,043 B2
(45) Date of Patent: Apr. 2, 2024

(54) SYSTEMS AND METHODS FOR IMAGE CAPTURE AND ANALYSIS OF AGRICULTURAL FIELDS

(71) Applicant: Climate LLC, San Francisco, CA (US)

(72) Inventors: Phil Baurer, West, TX (US); Justin Koch, Morton, IL (US); Doug Sauder, Livermore, CA (US); Brad Stoller, Eureka, IL (US)

(73) Assignee: Climate LLC, St. Louis, MO (US)

( * ) Notice: Subject to any disclaimer, the term of this patent is extended or adjusted under 35 U.S.C. 154(b) by 0 days.

(21) Appl. No.: 17/538,069

(22) Filed: Nov. 30, 2021

(65) Prior Publication Data

US 2022/0192099 A1 Jun. 23, 2022

Related U.S. Application Data

(63) Continuation of application No. 16/595,210, filed on Oct. 7, 2019, now Pat. No. 11,191,219, which is a
(Continued)

(51) Int. Cl.
*A01G 2/00* (2018.01)
*A01G 7/00* (2006.01)
(Continued)

(52) U.S. Cl.
CPC ............. *A01G 2/00* (2018.02); *A01G 7/00* (2013.01); *G06F 16/5838* (2019.01);
(Continued)

(58) Field of Classification Search
CPC ........ A01G 2/00; A01G 7/00; G06F 16/5838; G06F 16/5866; G06T 7/001;
(Continued)

(56) References Cited

U.S. PATENT DOCUMENTS 6,160,902 A * 12/2000 Dickson ............... G06T 7/90
382/110
6,608,672 B1   4/2003 Shibusawa et al.
(Continued)

FOREIGN PATENT DOCUMENTS

CA    2283767    2/2001
CA    2905119    9/2014
(Continued)

OTHER PUBLICATIONS

Julia et al, ("Optimal seeding rate for organic production of field pea in the northern Great Plains", School of Environment and Sustainability, . . . accepted Dec. 11, 2008), (Year: 2008).*
(Continued)

*Primary Examiner* — Amara Abdi
(74) *Attorney, Agent, or Firm* — Michael VanEngelen

(57) ABSTRACT

Described herein are systems and methods for capturing images of a field and performing agricultural data analysis of the images. In one embodiment, a computer system for monitoring field operations includes a database for storing agricultural image data including images of at least one stage of crop development that are captured with at least one of an apparatus and a remote sensor moving through a field. The computer includes at least one processing unit that is coupled to the database. The at least one processing unit is configured to execute instructions to analyze the captured images, to determine relevant images that indicate a change in at least one condition of the crop development, and to generate a localized view map layer for viewing the field at the at least one stage of crop development based on at least the relevant captured images.

26 Claims, 11 Drawing Sheets

Related U.S. Application Data continuation of application No. 15/841,203, filed on Dec. 13, 2017, now Pat. No. 10,438,343, which is a continuation of application No. PCT/US2016/039880, filed on Jun. 28, 2016.

(60) Provisional application No. 62/187,183, filed on Jun. 30, 2015.

(51) Int. Cl.

| | | |
|---|---|---|
| *G06F 16/58* | (2019.01) | |
| *G06F 16/583* | (2019.01) | |
| *G06F 16/587* | (2019.01) | |
| *G06T 7/00* | (2017.01) | |
| *G06V 20/56* | (2022.01) | |
| *H04N 7/18* | (2006.01) | |
| *A01B 79/00* | (2006.01) | |
| *G06V 20/68* | (2022.01) | |

(52) U.S. Cl.
CPC ........ *G06F 16/5866* (2019.01); *G06F 16/587* (2019.01); *G06T 7/001* (2013.01); *G06V 20/56* (2022.01); *H04N 7/185* (2013.01); *A01B 79/005* (2013.01); *G06T 2207/30128* (2013.01); *G06T 2207/30188* (2013.01); *G06V 20/68* (2022.01)

(58) Field of Classification Search
CPC .......... G06T 2207/30128; G06T 2207/30188; G06V 20/56; G06V 20/68; H04N 7/185; A01B 79/005
See application file for complete search history.

(56) References Cited

U.S. PATENT DOCUMENTS

| | | | |
|---|---|---|---|
| 8,712,148 | B2 | 4/2014 | Paris |
| 8,738,243 | B2 | 5/2014 | Sauder et al. |
| 8,767,194 | B2 | 7/2014 | Preiner et al. |
| 10,438,343 | B2 | 10/2019 | Baurer et al. |
| 11,191,219 | B2 | 12/2021 | Baurer et al. |
| 2004/0264762 | A1* | 12/2004 | Mas ................. G06V 20/10 382/154 |
| 2005/0126144 | A1 | 6/2005 | Koselka et al. |
| 2006/0191251 | A1 | 8/2006 | Pirro et al. |
| 2012/0004768 | A1 | 1/2012 | Schweitzer et al. |
| 2012/0109614 | A1 | 5/2012 | Lindores |
| 2013/0199807 | A1 | 8/2013 | Hoffman et al. |
| 2013/0238201 | A1 | 9/2013 | Redden |
| 2014/0089045 | A1* | 3/2014 | Johnson ................. G06Q 50/02 705/7.34 |
| 2015/0142250 | A1* | 5/2015 | Cavender-Bares .. A01C 23/008 111/200 |
| 2015/0163406 | A1 | 6/2015 | Laroia et al. |
| 2015/0094916 | A1 | 9/2015 | Bauerer et al. |
| 2015/0302305 | A1* | 10/2015 | Rupp ....................... G06N 7/06 706/46 |
| 2015/0310633 | A1* | 10/2015 | Nelan .................... G06T 7/0002 382/110 |
| 2016/0050840 | A1 | 2/2016 | Sauder et al. |
| 2017/0055433 | A1* | 3/2017 | Jamison ............... A01C 21/005 |
| 2017/0344922 | A1 | 11/2017 | Sauder et al. |
| 2018/0108123 | A1 | 4/2018 | Bauerer et al. |
| 2018/0114305 | A1* | 4/2018 | Strnad ................... G01S 13/885 |

FOREIGN PATENT DOCUMENTS

| | | |
|---|---|---|
| JP | 2013-145507 | 7/2013 |
| RU | 2537908 C2 | 1/2015 |
| WO | 2016/176355 | 11/2016 |
| WO | 2017/004074 | 1/2017 |

OTHER PUBLICATIONS

Zeliha, ("Tillage Effects on Soil Quality indicators in the Semi-Arid Mediterranean Coastal Plain of Turkey", Philipp Argic Scientist ISSN 0031-7454, vol. 92 No. 3, 290-300, Sep. 2009), (Year: 2009).*
Wang et al., "Research on Hyperspectral Reflectance Characteristics for Spring Wheat in Rainfed Agricultural Areas of Loess Plateau," IEEE 2007, pp. 3293-3296, (2007).
U.S. Appl. No. 16/595,210, filed Oct. 7, 2019, Baurer et al.
U.S. Appl. No. 15/841,203, filed Dec. 13, 2017, Baurer et al.
U.S. Appl. No. 16/595,210: (a) Office Action dated Dec. 24, 2020; (b) Office Action dated Apr. 21, 2021; and (c) Notice of Allowance dated Aug. 13, 2021. The instant application is a continuation of U.S. Appl. No. 16/595,210.
U.S. Appl. No. 15/841,203: (a) Office Action dated Dec. 31, 2018; and (b) Notice of Allowance dated Jun. 14, 2019. The instant application has the same priority claim as U.S. Appl. No. 15/841,203.
PCT/US2016/039880: PCT International Search Report and Written Opinion (8 pages), dated Dec. 2, 2016. PCT/US2016/039880 has the same priority as the instant application.
EP1618613.8: Extended European Search Report dated Jan. 28, 2019. EP1618613.8 has the same priority as the instant application.
UA201800425: Preliminary Conclusion of the Substantive Examination dated Jun. 7, 2021. UA201800425 has the same priority as the instant application.
AU2021218100: Examination Report dated Oct. 5, 2022. AU2021218100 has the same priority as the instant application.

* cited by examiner (a)
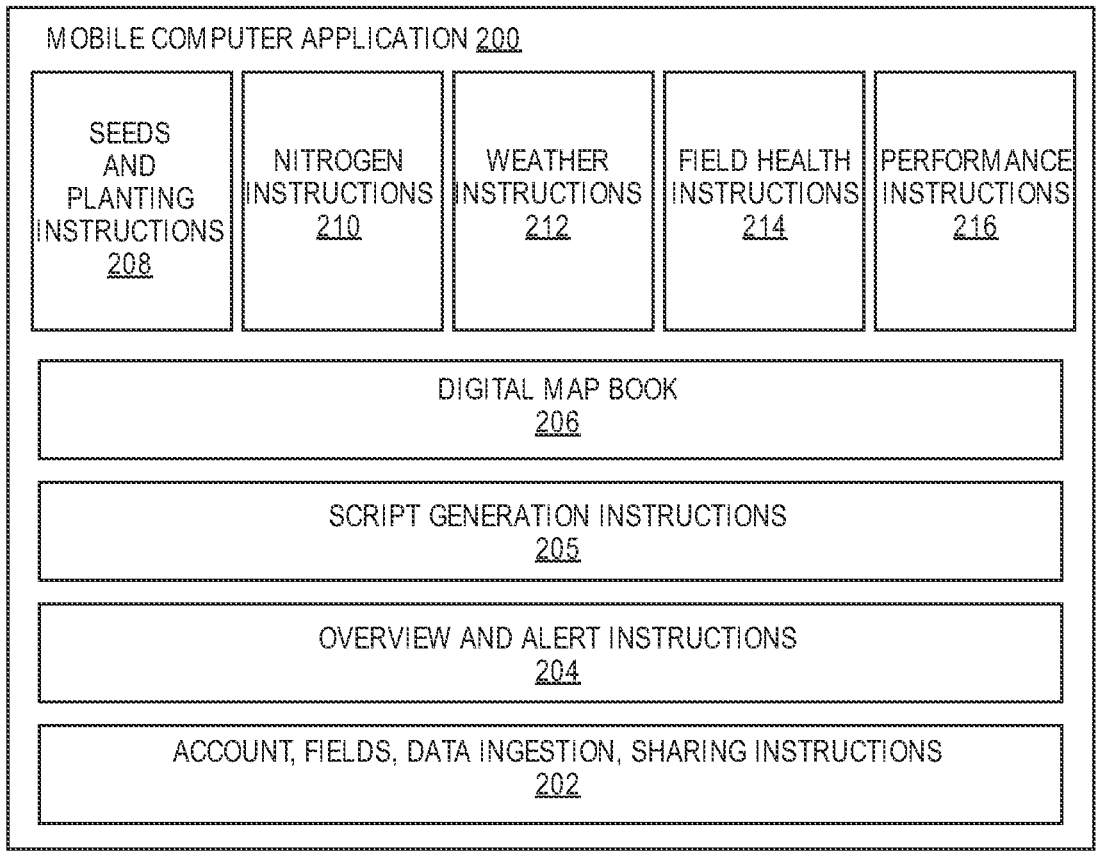
(b)
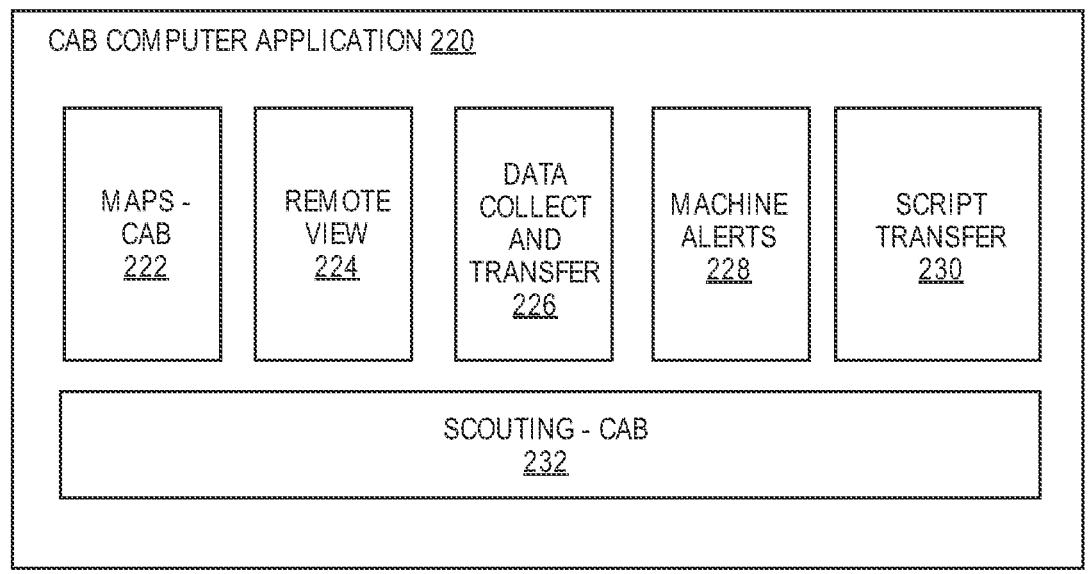
FIG. 2

Data Manager

| Nitrogen | Planting | Practices | Soil |

Planting 1(4 Fields)
Crop Corn Product
Plant Date: 2016-04-12
ILU 112 | Pop: 34000
[Edit] [Apply]

Planting 2(0 Fields)
Crop Corn Product
Plant Date: 2016-04-15
ILU 83 | Pop: 34000
[Edit] [Apply]

Planting 3(0 Fields)
Crop Corn Product
Plant Date: 2016-04-13
ILU 83 | Pop: 34000
[Edit] [Apply]

Planting 4(1 Fields)
Crop Corn Product
Plant Date: 2016-04-13
ILU 112 | Pop: 34000
[Edit] [Apply]

[+] Add New Planting Plan

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

601

*FIG. 6*

SYSTEMS AND METHODS FOR IMAGE CAPTURE AND ANALYSIS OF AGRICULTURAL FIELDS

RELATED APPLICATIONS

This application claims the benefit as a continuation under 35 U.S.C. § 120 of U.S. application Ser. No. 16/595,210, filed Oct. 7, 2019, which is a continuation under 35 U.S.C. § 120 of U.S. application Ser. No. 15/841,203, filed Dec. 13, 2017, now U.S. Pat. No. 10,438,343, issued Oct. 8, 2019, which is a continuation under 35 U.S.C. § 120 of PCT international application PCT/US2016/039880, filed Jun. 28, 2016, which claims the benefit of provisional application 62/187,183, filed Jun. 30, 2015, the entire contents of each of which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 The Climate Corporation.

TECHNICAL FIELD

Embodiments of the present disclosure relate to systems and methods for image capture and analysis of agricultural fields.

BACKGROUND

Planters are used for planting seeds of crops (e.g., corn, soybeans) in a field. Some planters include a display monitor within a cab for displaying a coverage map that shows regions of the field that have been planted. The coverage map of the planter is generated based on planting data collected by the planter.

A combine harvester or combine is a machine that harvests crops. A coverage map of a combine displays regions of the field that have been harvested by that combine. A coverage map allows the operator of the combine know that a region of the field has already been harvested by the same combine. Yield data for a field can then be generated after harvesting the field. The yield data can be analyzed in order to potentially improve agricultural operations for a subsequent growing season.

SUMMARY

In one embodiment, a computer system for monitoring field operations includes a database for storing agricultural image data including images of at least one stage of crop development that are captured with at least one of an apparatus and a remote sensor moving through a field. At least one processing unit is coupled to the database. The at least one processing unit is configured to execute instructions to analyze the captured images, to determine relevant images that indicate a change in at least one condition of the crop development, and to generate a localized view map layer for viewing the field at the at least one stage of crop development based on at least the relevant captured images.

In one embodiment, a method of capturing images and analysis for an application pass of an agricultural crop includes performing, with an apparatus, an application pass for a field and at the same time capturing images of the field including crops if visible during the application pass. The method further includes generating a localized view for viewing the field during the application pass based on the captured images and automatically analyzes the application pass including at least one of a planting analysis, a fertilizer analysis, a harvesting analysis, and a tillage analysis based on the images captured during the application pass.

BRIEF DESCRIPTION OF THE DRAWINGS

The present disclosure is illustrated by way of example, and not by way of limitation, in the accompanying drawings and in which:

FIG. 2 illustrates two views of an example logical organization of sets of instructions in main memory when an example mobile application is loaded for execution.

FIG. 6 depicts an example embodiment of a spreadsheet view for data entry.

DETAILED DESCRIPTION

Described herein are systems and methods for capturing images of a field and performing agricultural data analysis of the images. In one embodiment, a method includes moving at least one of an apparatus and a remote sensor through a field at a stage of crop development and capturing images of the field including a crop (e.g., corn, soybeans). The method further includes analyzing the captured images and determining relevant images that indicate a change in at least one condition of the crop development. The method further includes generating a localized view map layer for viewing the field at the stage of crop development based on at least the relevant captured images A computer system includes at least one processing unit that is configured to execute instructions to analyze the captured images, to determine relevant images that indicate a change in at least one condition of the crop development, and to generate a localized view map layer for viewing the field at the at least one stage of crop development based on at least the relevant captured images. A user can view the localized view map layer in order to have a better understanding of actual current field conditions for the selected region. The user can identify any potential issues and take corrective action or different action during a current growing season of the crop to improve crop yield for the current growing season of the crop.

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Figure 1:
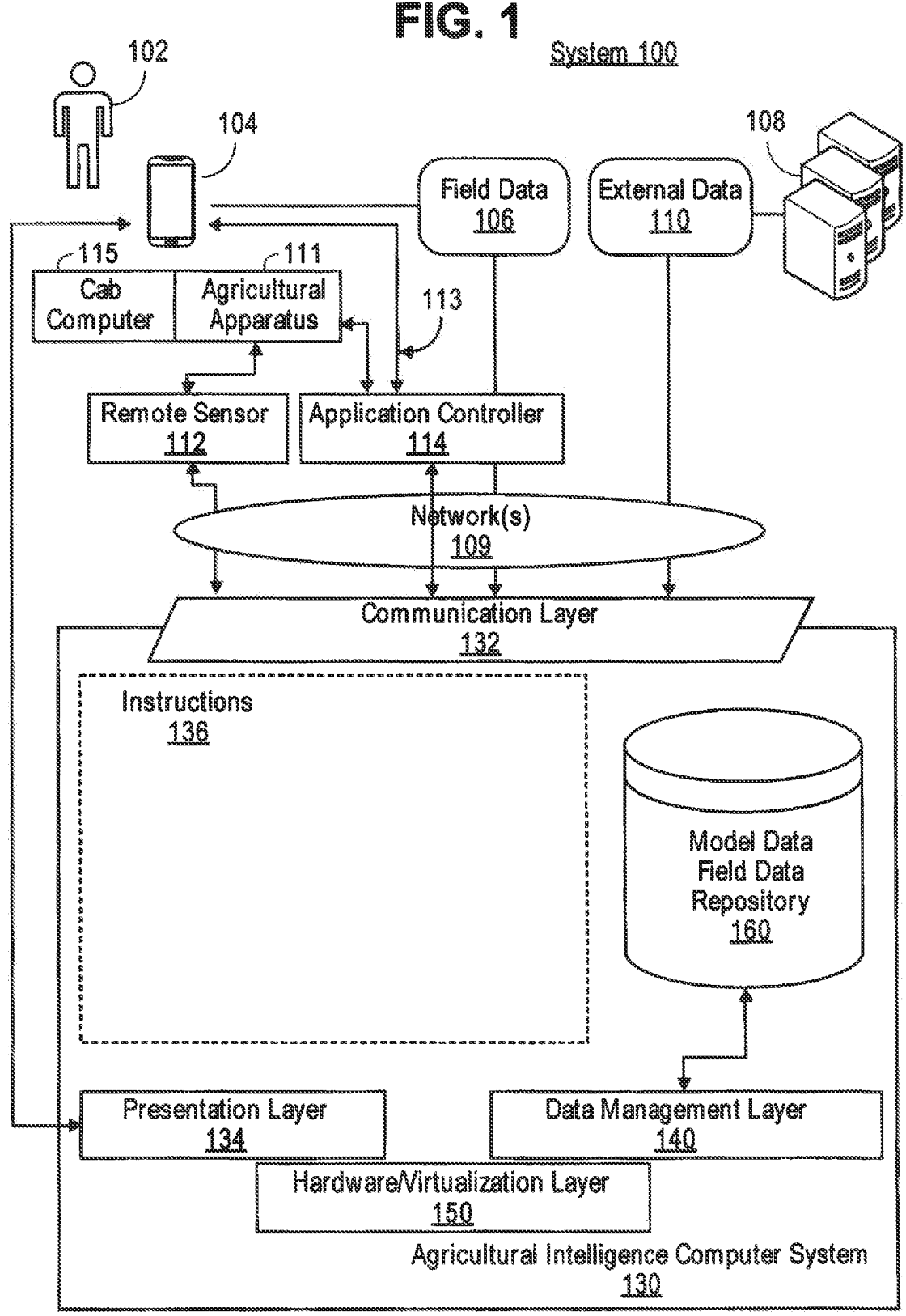
FIG. 1 illustrates an example computer system that is configured to perform the functions described herein, shown in a field environment with other apparatus with which the system may interoperate.

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, commodity price information (e.g., crop price, crop revenue), grain moisture, tillage practice, and previous growing season information (c) soil data (for example, type, composition, pH, organic matter (OM), cation exchange capacity (CEC)), (d) planting data (for example, planting date, seed(s) type, relative maturity (RM) of planted seed(s), seed population, input cost information (e.g., cost of seed)), and proprietary indices (e.g., ratio of seed population to a soil parameter), etc.) for the fields that are being monitored), (e) fertilizer data (for example, nutrient type (Nitrogen, Phosphorous, Potassium), application type, application date, amount, source, method, cost of nutrients), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, drone, self-guided device, self-propelled device, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, field conditions, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, drone, self-guided device, self-propelled device, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, California, is used. Sensor data may consist of the same type of information as field data 106. In some embodiments, remote sensors 112 may not be fixed to an agricultural apparatus 111 but may be remotely located in the field and may communicate with network 109.

The apparatus 111 may optionally comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive agricultural data including field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, instructions 136, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
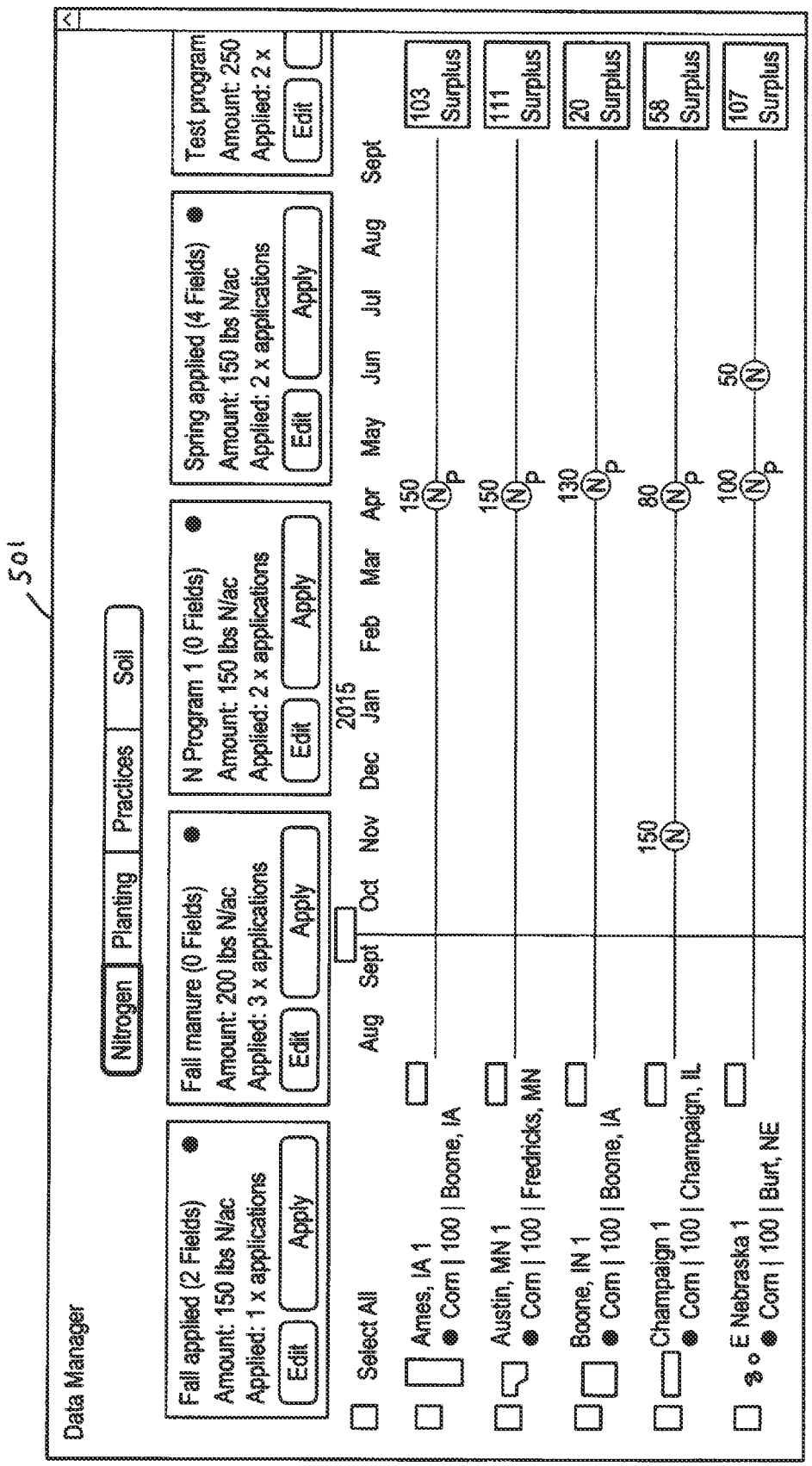
FIG. 5 depicts an example embodiment of a timeline view for data entry.

FIG. 5 depicts an example embodiment of a timeline view 501 for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view 601 for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
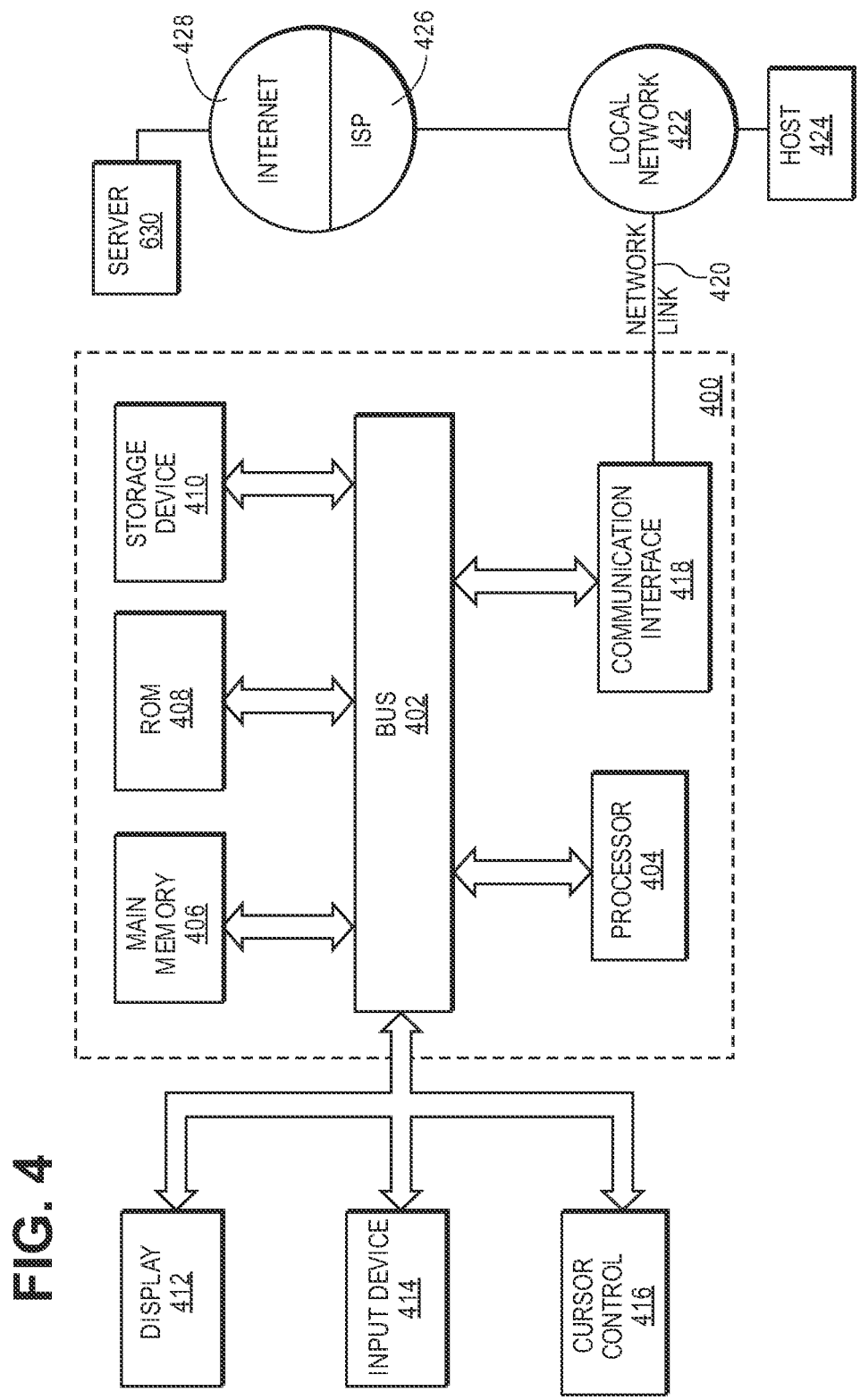
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies. In one example, instructions 136 include different types of instructions for monitoring field operations, capturing images of crop development and field operations, and performing agricultural data analysis based on the captured images. The instructions 136 may include agricultural data analysis instructions including instructions for performing the operations of the methods described herein. The instructions 136 can be included with the programmed instructions of the layer 150.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation for at least one stage of crop development and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include correlations between yield and another parameter or variable of agricultural data, yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, image sensors (e.g., image capturing device for capturing images of crops or soil conditions), planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include image capturing devices or cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In another embodiment, sensors 112 and controllers 114 may comprise weather devices for monitoring weather conditions of fields. For example, the apparatus disclosed in International Pat. Application No. PCT/US2016/029609 may be used, and the present disclosure assumes knowledge of those patent disclosures.

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, image data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
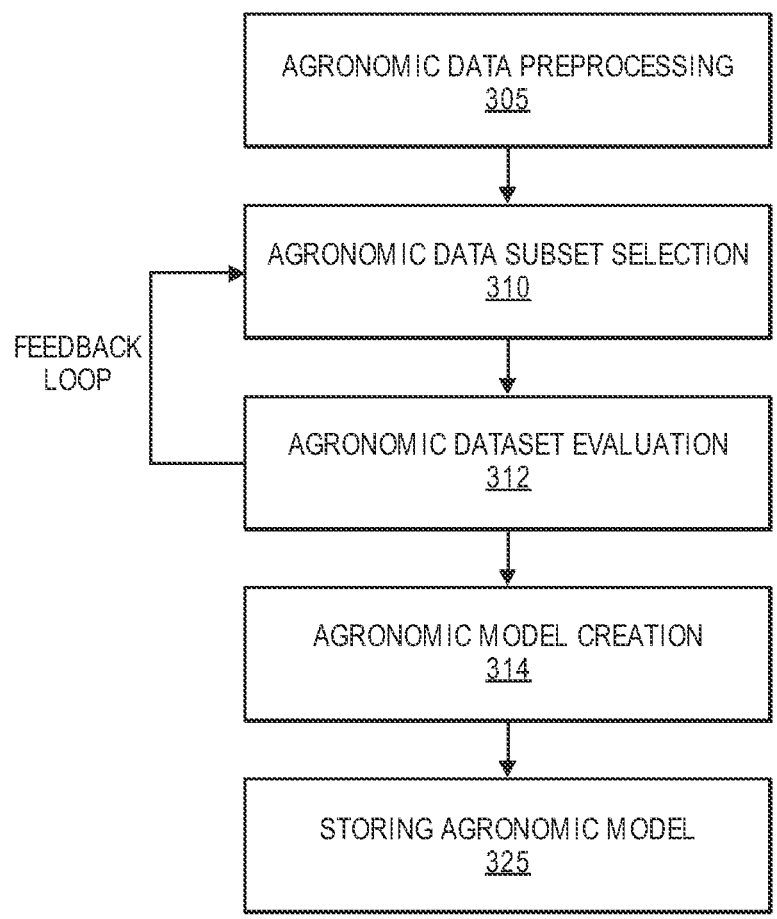
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Figure 7:
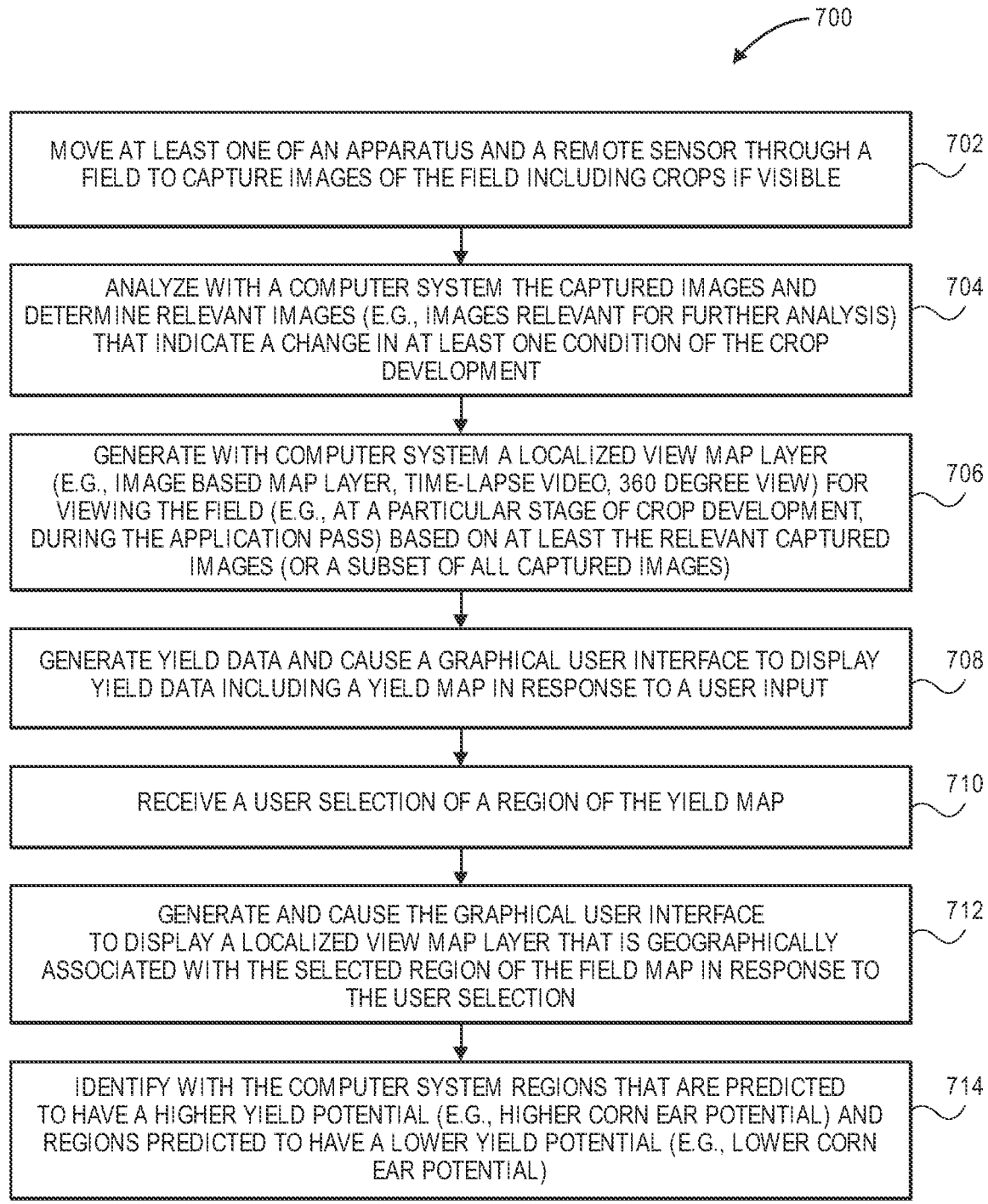
FIG. 7 illustrates a flow diagram of one embodiment for a method 700 of capturing images and creating a local view map layer for an application pass of an agricultural crop.

FIG. 7 illustrates a flow diagram of one embodiment for a method 700 of capturing images and creating a local view map layer for an application pass of an agricultural crop. The method 700 is performed by processing logic that may comprise hardware (circuitry, dedicated logic, etc.), software (such as is run on a general purpose computer system or a dedicated machine or a device), or a combination of both. In one embodiment, the method 700 is performed by processing logic of at least one computer system (e.g., computer system 130, computer system 400, field manager computing device 104, cab computer 115, application controller 114, remote sensor 112, drone, self-guided device, self-propelled device, etc.). The computer system executes instructions of a software application or program with processing logic. The software application or program can be initiated by the computer system, an apparatus, or remote sensor. In one example, a computer system, a field manager computing device 104, cab computer 115, application controller 114, apparatus 111, remote sensor 112, drone, self-guided device, or self-propelled device performs some or all of the operations of the method 200. In another example, a computer system 130 in combination with the field manager computing device 104, cab computer 115, application controller 114, apparatus 111, remote sensor 112, drone, self-guided device, or self-propelled device perform the operations of the method 700.

At block 702, at least one of an apparatus (e.g., field manager computing device 104, cab computer 115, application controller 114, apparatus 111) and a remote sensor (e.g., remote sensor 112, image sensor, image capturing device, drone, self-guided device, self-propelled device, etc.) move through a field to capture images of the field including crops if visible. An initiated software application may control operations of an image capturing device of the apparatus or remote sensor. The remote sensor may be integrated with or coupled to the apparatus (e.g., agricultural apparatus 111) that performs an application pass (e.g., planting, tillage, fertilization). The source of images during any pass could be a drone with a camera that is instructed to track (e.g., lead or follow) the machine (e.g., agricultural apparatus 111) making the field pass and capture images of standing crop in front of the machine, processed crop (e.g., corn ears) entering the machine, or soil and crop residue in soil over which the machine has already traveled. In another example, a user walks through a field and captures images with a mobile device or tablet device having an image capture device (e.g., camera) and the software application. In another example, a user guides an apparatus (e.g., apparatus with wheels and support frame for positioning image capture devices) having at least one image capture device (e.g., remote sensor 112) through a field for capturing images. In another example, a self-guided or self-propelled device moves through a field for capturing images with the software application. The software application controls whether images are captured continuously or during time periods of more stable movement as opposed to unstable movement.

At block 704, a computer system (e.g., computer system 130, computer system 400, field manager computing device 104, cab computer 115, application controller 114, remote sensor 112, drone, self-guided device, self-propelled device, etc.) analyzes the captured images and determines relevant images that indicate a change in at least one condition of the crop development (e.g., images relevant for further analysis, images showing a change in crop development, change in ear potential, change in yield, change in weed coverage, images showing a lower predicted yield, etc.). At block 706, the computer system generates a localized view map layer (e.g., image based map layer, time-lapse video, 360 degree view) for viewing the field (e.g., at a particular stage of crop development, during the application pass) based on at least the relevant captured images (or a subset of all captured images). An image based map layer may comprise a map layer of image capture locations (e.g., locations along a travel path of a vehicle or implement traversing the field.) In this manner, fewer images and more relevant images may be saved to reduce memory resources needed for saving these images and a localized view map layer.

At block 708, the computer system generates and causes a graphical user interface to display yield data including a yield map in response to a user input. At block 710, the computer system receives a user selection of a region of the yield map. At block 712, the computer system generates and causes a graphical user interface to display a localized view map layer that is geographically associated with the selected region of the field map in response to the user selection. The localized view map layer may be superimposed with a second map layer (e.g., an agronomic information layer such as a yield map, a planting population map, a seed spacing map, a planting downforce map, or a field health map such as an NDVI map). The user can then identify a region of interest in the second map layer and select the region of interest in the superimposed localized view map layer in order to view images and/or video captured for the region of interest and have a better understanding of actual field conditions for the selected region. If the selected region has lower yield than other regions, then a user may be able to identify any issues (e.g., weed coverage, shorter crops in comparison to crops in other regions, smaller ear size for corn, crops with fewer leaves in comparison to crops in other regions) that cause the lower yield. If the selected region has higher yield than other regions, then a user may be able to identify certain crop characteristics or parameters (e.g., lack of weed coverage, taller crops in comparison to crops in other regions, larger ear size for corn, crops with more leaves in comparison to crops in other regions) that cause the higher yield.

In another embodiment, blocks 708 and 710 are optional. A user may want to view the view map layer early in a growing season or prior to yield data being available. In this case, at block 714, the computer system identifies regions that are predicted to have a higher yield potential (e.g., higher corn ear potential) and regions predicted to have a lower yield potential (e.g., lower corn ear potential). Due to the predictions of regions with higher and lower yield potential, a user may be able to take action to increase yield in the lower yield potential regions. For example, a user can increase or decrease fertilization, spraying, etc. as appropriate. A user can also remove crops that are predicted to have a lower yield potential and this may increase yield for neighboring crops.

Figure 8:
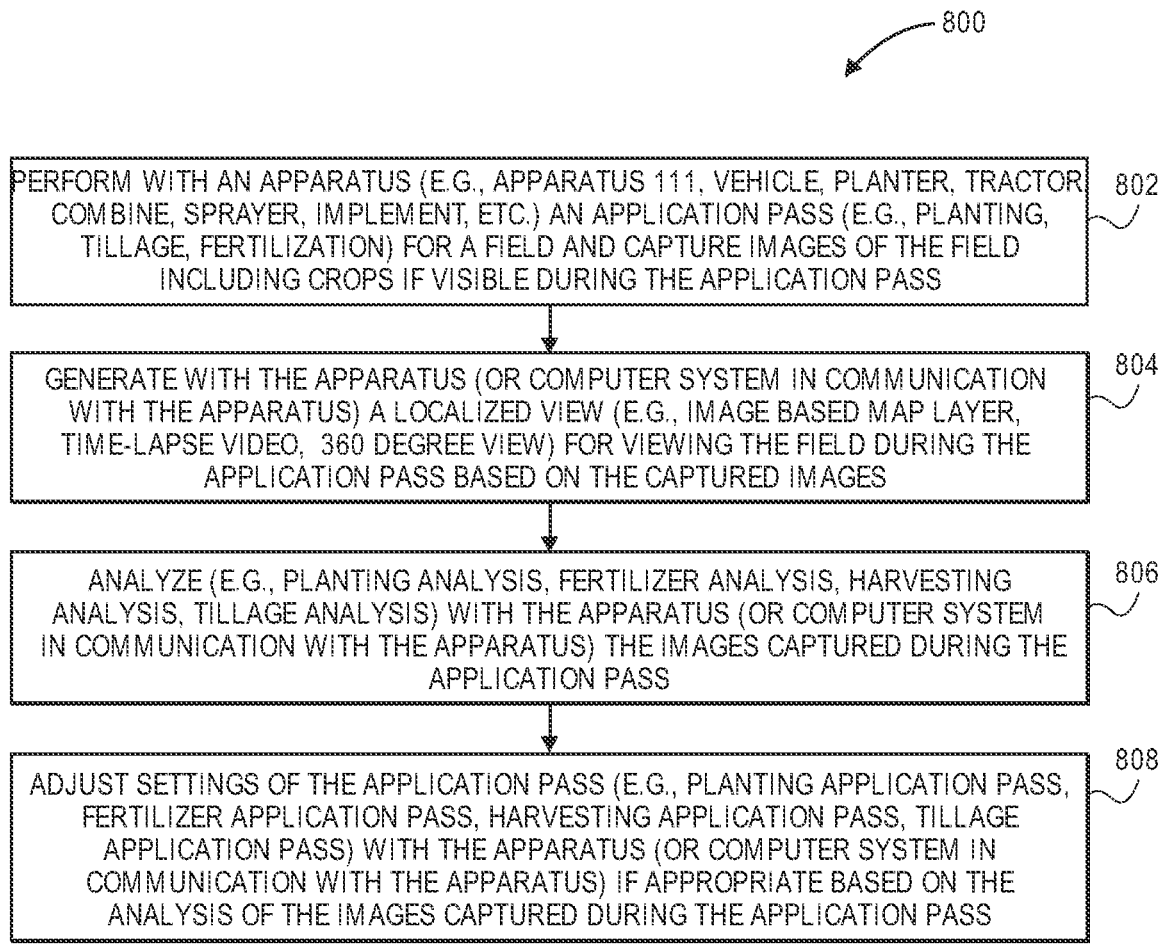
FIG. 8 illustrates a flow diagram of one embodiment for a method 800 of capturing images and creating a local view map layer for an application pass of an agricultural crop.

FIG. 8 illustrates a flow diagram of one embodiment for a method 800 of capturing images and analysis for an application pass of an agricultural crop. The method 800 is performed by processing logic that may comprise hardware (circuitry, dedicated logic, etc.), software (such as is run on a general purpose computer system or a dedicated machine or a device), or a combination of both. In one embodiment, the method 800 is performed by processing logic of at least one computer system (e.g., computer system 130, computer system 400, field manager computing device 104, cab computer 115, application controller 114, remote sensor 112, drone, self-guided device, self-propelled device, etc.). The computer system executes instructions of a software application or program with processing logic. The software application or program can be initiated by the computer system, an apparatus, or remote sensor. In one example, a computer system, a field manager computing device 104, cab computer 115, application controller 114, apparatus 111, remote sensor 112, drone, self-guided device, or self-propelled device performs some or all of the operations of the method 200. In another example, a computer system 130 in combination with the field manager computing device 104, cab computer 115, application controller 114, apparatus 111, remote sensor 112, drone, self-guided device, or self-propelled device perform the operations of the method 800.

At block 802, an apparatus (e.g., apparatus 111, vehicle, planter, tractor, combine, sprayer, implement, etc.) performs an application pass (e.g., planting, tillage, fertilization, etc.) for a field and at the same time captures images of the field including crops if visible during the application pass. Alternatively, a remote sensor (e.g., remote sensor 112, drone, image capture device) associated with the apparatus captures images during the application pass. The source of images during any pass could be a drone with a camera that is instructed to track (e.g., lead or follow) the machine making the field pass.

At block 804, the apparatus (or computer system in communication with the apparatus) generates a localized view (e.g., image based map layer, time-lapse video, 360 degree view) for viewing the field during the application pass based on the captured images. At block 806, the apparatus (or computer system in communication with the apparatus) automatically analyzes (e.g., planting analysis, fertilizer analysis, harvesting analysis, tillage analysis) the images captured during the application pass. The apparatus (or computer system in communication with the apparatus) automatically performs the analysis in real-time during the application pass or alternatively if necessary communicates with an agricultural system for analysis of the images. At block 808, the apparatus (or computer system in communication with the apparatus) adjusts settings of the application pass if appropriate based on the analysis of the images captured during the application pass.

For example, in a planting application pass, the planting analysis may include determining current field conditions (e.g., wet soil, dry soil, weather conditions, etc.) from the captured images and this analysis may cause an adjustment to parameters (e.g., speed of the planter, downforce, etc.) of the planter during the planting pass. In another example, in a fertilizer application pass, a remote sensor (e.g., drone camera) could lead the apparatus, machine, or implement, gather images of the plants ahead of the apparatus, machine or implement, determine a crop health criterion (e.g., crop growth stage, percentage or amount of weed cover) based on the images as part of the fertilizer analysis at block 806, and then adjust settings automatically at block 808 or by transmitting the criterion to the apparatus, machine or implement which could adjust an application rate for the fertilizer based on the crop health criterion. In one example, a lower amount of weed cover in a certain region or strip of a field would result in less fertilizer being applied in this certain region or strip of the field. Conversely, a higher amount of weed cover in a certain region or strip of a field would result in more fertilizer being applied in this certain region or strip of the field.

In another example, in a harvesting application pass, the analysis at block 806 includes identifying crop components (e.g., corn ears) in a crop processing device (e.g., corn head) and identify size and health of the crop component (e.g., corn ears). The analysis may also include determining a delay between chopping a crop stalk (e.g., corn stalk) and identification of a crop component (e.g., corn ear). A device or structure could be added to a header of a combine to orient crop components (e.g., corn ears) in a proper position for an image capture device of the combine. A light source (e.g., halogen lamp, infrared LED) may be installed to the external portion of the harvesting equipment (e.g., to the combine head) or to an interior region of the harvesting equipment (e.g., in the feeder house) in order to illuminate the crops about to be harvested and/or the harvested crop components (e.g., corn ears) for better analysis. Analysis of the stalks or ears would then be used for adjusting settings of the combine at block 808.

In another example, in a tillage application pass, the analysis at block 806 includes residue analysis of soil after the tillage pass. The analysis can be used for adjusting settings of the apparatus or implement during the tillage application pass.

Figure 9:
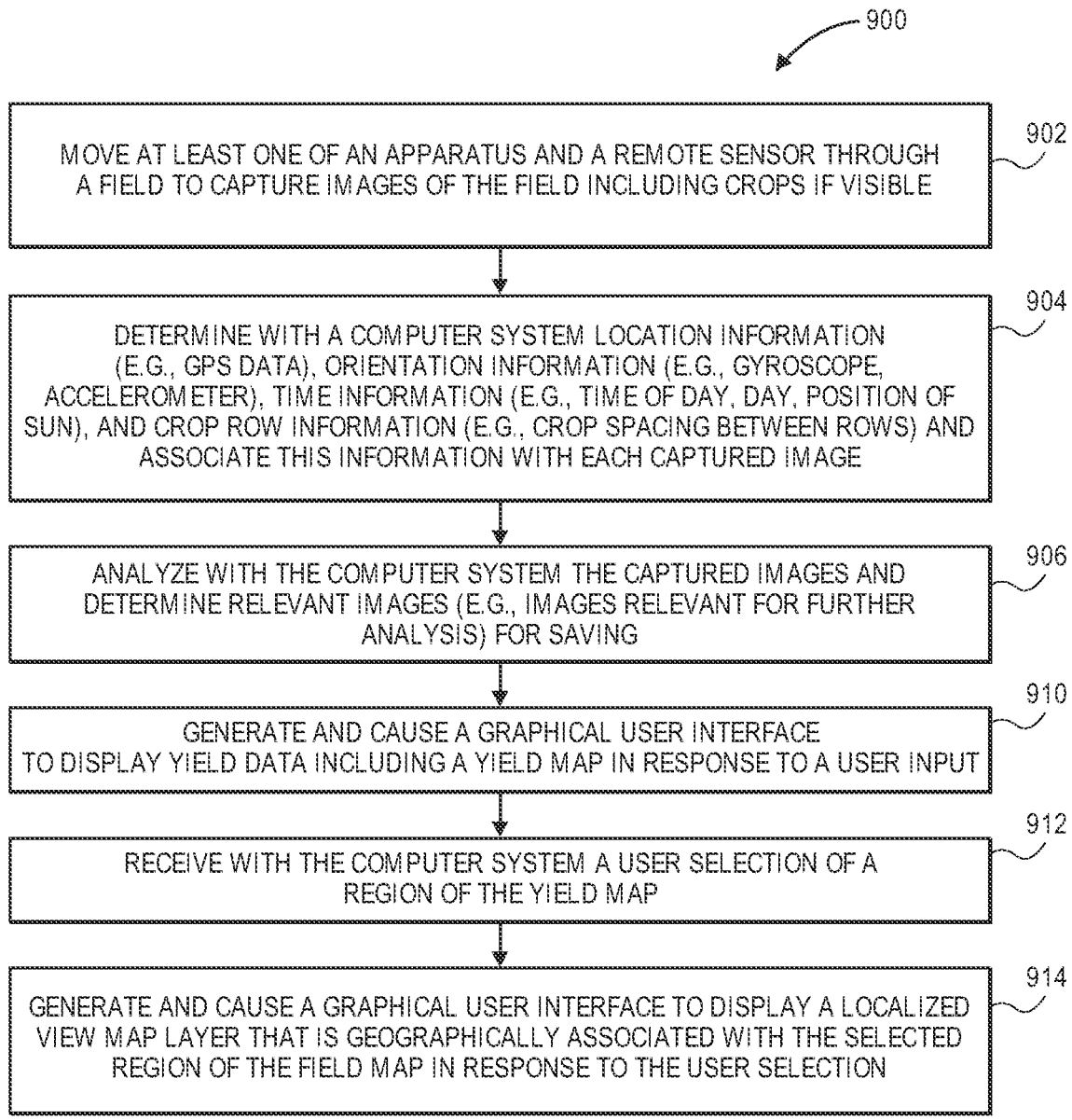
FIG. 9 illustrates a flow diagram of one embodiment for a method 900 of capturing images of an agricultural crop in a field and determines crop information of the agricultural crop in the field.

FIG. 9 illustrates a flow diagram of one embodiment for a method 900 of capturing images of an agricultural crop in a field and determines crop information of the agricultural crop in the field. The method 900 is performed by processing logic that may comprise hardware (circuitry, dedicated logic, etc.), software (such as is run on a general purpose computer system or a dedicated machine or a device), or a combination of both. In one embodiment, the method 900 is performed by processing logic of at least one computer system (e.g., computer system 130, computer system 400, field manager computing device 104, cab computer 115, application controller 114, apparatus 111, remote sensor 112, drone, self-guided device, self-propelled device, etc.). The computer system executes instructions of a software application or program with processing logic. The software application or program can be initiated by the computer system, an apparatus, or remote sensor. In one example, a computer system, a field manager computing device 104, cab computer 115, application controller 114, remote sensor 112, drone, self-guided device, or self-propelled device performs some or all of the operations of the method 900. In another example, a computer system 130 in combination with the field manager computing device 104, cab computer 115, application controller 114, apparatus 111, remote sensor 112, drone, self-guided device, or self-propelled device perform the operations of the method 900.

At block 902, at least one of an apparatus (e.g., field manager computing device 104, cab computer 115, application controller 114, apparatus 111) and a remote sensor (e.g., remote sensor 112, image sensor, image capturing device, drone, self-guided device, self-propelled device, etc.) move through a field to capture images of the field including crops if visible. An initiated software application (e.g., image capture software application, field application) may control operations of an image capturing device or may control operations of multiple image capturing devices that are associated with at least one of the apparatus and the remote sensor. In one example, two rows of a crop are captured by the images. The remote sensor may be integrated with or coupled to the apparatus (e.g., agricultural apparatus 111) that performs an application pass (e.g., planting, tillage, fertilization) or moves through the field.

The source of images during any pass could be a remote sensor (e.g., drone with a camera) that is instructed to track (e.g., lead or follow) the apparatus making the field pass. In another example, a user walks through a field and captures images with a mobile device or tablet device having an image capture device (e.g., camera) and the software application. In another example, a user guides an apparatus (e.g., apparatus with wheels and support frame for positioning image capture devices) having at least one image capture device through a field for capturing images. In another example, a self-guided or self-propelled device or robot moves through a field for capturing images with the software application. The software application controls whether images are captured continuously or during time periods of more stable movement as opposed to unstable movement.

At block 904, a computer system (e.g., computer system 130, computer system 400, field manager computing device 104, cab computer 115, application controller 114, remote sensor 112 (e.g., image sensor, image capturing device), drone, self-guided device, self-propelled device, etc.) determines location information (e.g., GPS data), orientation information (e.g., gyroscope, accelerometer), time information (e.g., time of day, day, position of sun), and crop row information (e.g., crop spacing between rows) and associates this information with each captured image. In one example, crop row spacing for corn is set at a fixed spacing (e.g., 30 inches) which may be input by the user and can act as a reference for determining characteristics of a crop. At block 906, the computer system analyzes the captured images and determines relevant images (e.g., images relevant for further analysis) for saving. At block 908, the computer system generates a localized view map layer (e.g., image based map layer, time-lapse video, 360 degree view) for viewing the field (e.g., at a particular stage of crop development, during the application pass) based on at least the relevant captured images (or a subset of all captured images). In this manner, fewer images and more relevant images may be saved to reduce memory resources needed for saving these images and a localized view map layer. At block 910, the computer system generates and causes a graphical user interface to display yield data including a yield map in response to a user input. At block 912, the computer system receives a user selection of a region of the yield map. At block 914, the computer system generates and causes the graphical user interface to display a localized view map layer that is geographically associated with the selected region of the field map in response to the user selection. The localized view map layer may be superimposed with the yield map. The user can view the localized view map layer in order to have a better understanding of actual field conditions for the selected region. If the selected region has lower yield than other regions, then a user may be able to identify any issues (e.g., weed coverage) that cause the lower yield or identify crop characteristics or parameters (shorter crops in comparison to crops in other regions, smaller ear size for corn, crops with fewer leaves in comparison to crops in other regions) that correlate with the lower yield. If the selected region has higher yield than other regions, then a user may be able to identify any issues (e.g., lack of weed coverage) that cause the higher yield or identify certain crop characteristics or parameters (e.g., lack of weed coverage, taller crops in comparison to crops in other regions, larger ear size for corn, crops with more leaves in comparison to crops in other regions) that correlate with the higher yield.

Figure 10:
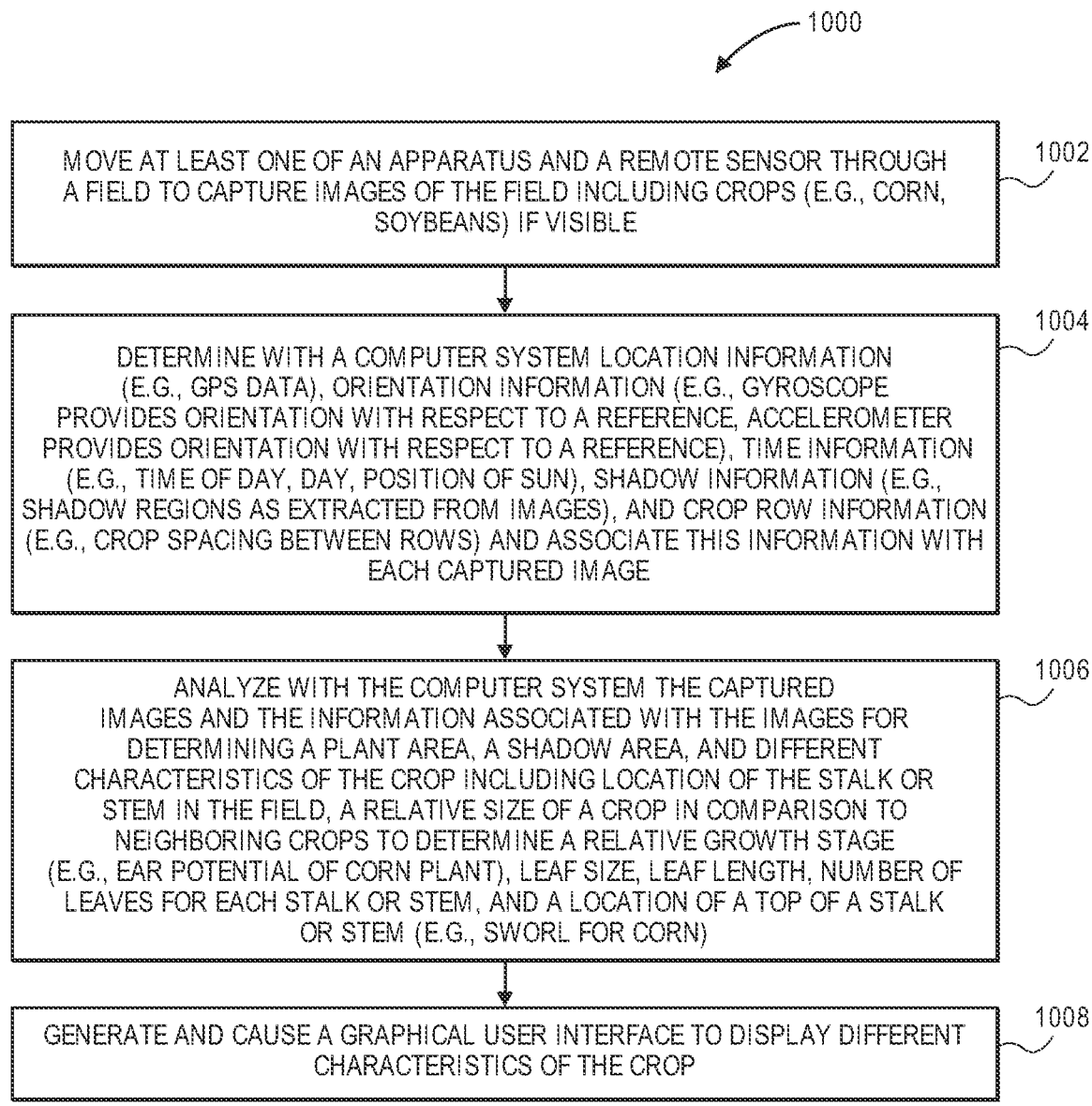
FIG. 10 illustrates a flow diagram of one embodiment for a method 1000 of determining characteristics of an agricultural crop (e.g., corn) in a field based on capturing images of the crop in the field.

FIG. 10 illustrates a flow diagram of one embodiment for a method 1000 of determining characteristics of an agricultural crop (e.g., corn) in a field based on capturing images of the crop in the field. The method 1000 is performed by processing logic that may comprise hardware (circuitry, dedicated logic, etc.), software (such as is run on a general purpose computer system or a dedicated machine or a device), or a combination of both. In one embodiment, the method 1000 is performed by processing logic of at least one computer system (e.g., computer system 130, computer system 400, field manager computing device 104, cab computer 115, application controller 114, remote sensor 112, drone, self-guided device, self-propelled device, etc.). The computer system executes instructions of a software application or program with processing logic. The software application or program can be initiated by the computer system, an apparatus, or remote sensor. In one example, a computer system, a field manager computing device 104, cab computer 115, application controller 114, apparatus 111, remote sensor 112, drone, self-guided device, or self-propelled device performs some or all of the operations of the method 1000. In another example, a computer system 130 in combination with the field manager computing device 104, cab computer 115, application controller 114, apparatus 111, remote sensor 112, drone, self-guided device, or self-propelled device perform the operations of the method 1000.

At block 1002, at least one of an apparatus (e.g., field manager computing device 104, cab computer 115, application controller 114, apparatus 111) and a remote sensor (e.g., remote sensor 112, image sensor, image capturing device, drone, self-guided device, self-propelled device, etc.) move through a field to capture images of the field including crops if visible. An initiated software application (e.g., image capture software application, field application) may control operations of an image capturing device or may control operations of multiple image capturing devices that are associated with at least one of the apparatus and the remote sensor. In one example, two rows of a crop are captured by the images. The images can be captured from different viewpoints (e.g., top view image above a crop, side view image from side of a crop). An initiated software application may control operations of an image capturing device of the apparatus or remote sensor. The remote sensor may be integrated with or coupled to the apparatus (e.g., agricultural apparatus 111) that performs an application pass (e.g., planting, tillage, fertilization). The source of images during any pass could be a remote sensor (e.g., drone with a camera) that is instructed to track (e.g., lead or follow) the machine making the field pass. In another example, a user walks through a field and captures images with a mobile device or tablet device having an image capture device (e.g., camera) and the software application. In another example, a user guides an apparatus (e.g., apparatus with wheels and support frame for positioning image capture devices) having at least one image capture device through a field for capturing images. In another example, a self-guided or self-propelled device or robot moves through a field for capturing images with the software application. The software application controls whether images are captured continuously or during time periods of more stable movement as opposed to unstable movement.

At block 1004, a computer system (e.g., computer system 130, computer system 400, field manager computing device 104, cab computer 115, application controller 114, remote sensor 112 (e.g., image sensor, image capturing device), drone, self-guided device, self-propelled device, etc.) determines location information (e.g., GPS data), orientation information (e.g., gyroscope provides orientation of apparatus or remote sensor with respect to a reference, accelerometer provides orientation of apparatus or remote sensor with respect to a reference), time information (e.g., time of day, day, position of sun), shadow information (e.g., shadow regions as extracted from images), and crop row information (e.g., crop spacing between rows) and associates this information with each captured image. In one example, crop row spacing for corn is set at a fixed spacing (e.g., 30 inches) which may be input by the user and can act as a reference for determining characteristics of a crop. At block 1006, the computer system analyzes the captured images and the information associated with the images for determining a plant area (e.g., green plant area), a shadow area, and different characteristics of the crop including location of the stalk or stem in the field, a relative size of a crop in comparison to neighboring crops to determine a relative growth stage (e.g., ear potential of corn plant), leaf size, leaf length, number of leaves for each stalk or stem, and a location of a top of a stalk or stem (e.g., sworl for corn). The plant area and shadow area may be used in determining the different characteristics of the crop. At block 1008, the computer system generates and causes a graphical user interface to display different characteristics of the crop. If the crop characteristics (e.g., ear potential) indicates or predicts a lower yield than other regions, then a user may be able to identify any issues (e.g., weed coverage, shorter crops in comparison to crops in other regions, smaller ear size for corn, crops with fewer leaves in comparison to crops in other regions) that cause the lower yield and take a corrective action (e.g., fertilization application, spraying application) or different action (e.g., replant). If the selected region has higher yield than other regions, then a user may be able to identify certain crop characteristics or parameters (e.g., lack of weed coverage, taller crops in comparison to crops in other regions, larger ear size for corn, crops with more leaves in comparison to crops in other regions) that cause the higher yield.

The computer system may be integrated with or coupled to an apparatus that performs an application pass (e.g., planting, tillage, fertilization). Alternatively, the computer system may be integrated with a remote sensor (e.g., drone, image capture device) associated with the apparatus that captures images during the application pass.

In some embodiments, the operations of the method(s) disclosed herein can be altered, modified, combined, or deleted. The methods in embodiments of the present disclosure may be performed with a device, an apparatus, or computer system as described herein. The device, apparatus, or computer system may be a conventional, general-purpose computer system or special purpose computers, which are designed or programmed to perform only one function, may also be used.

Figure 11:
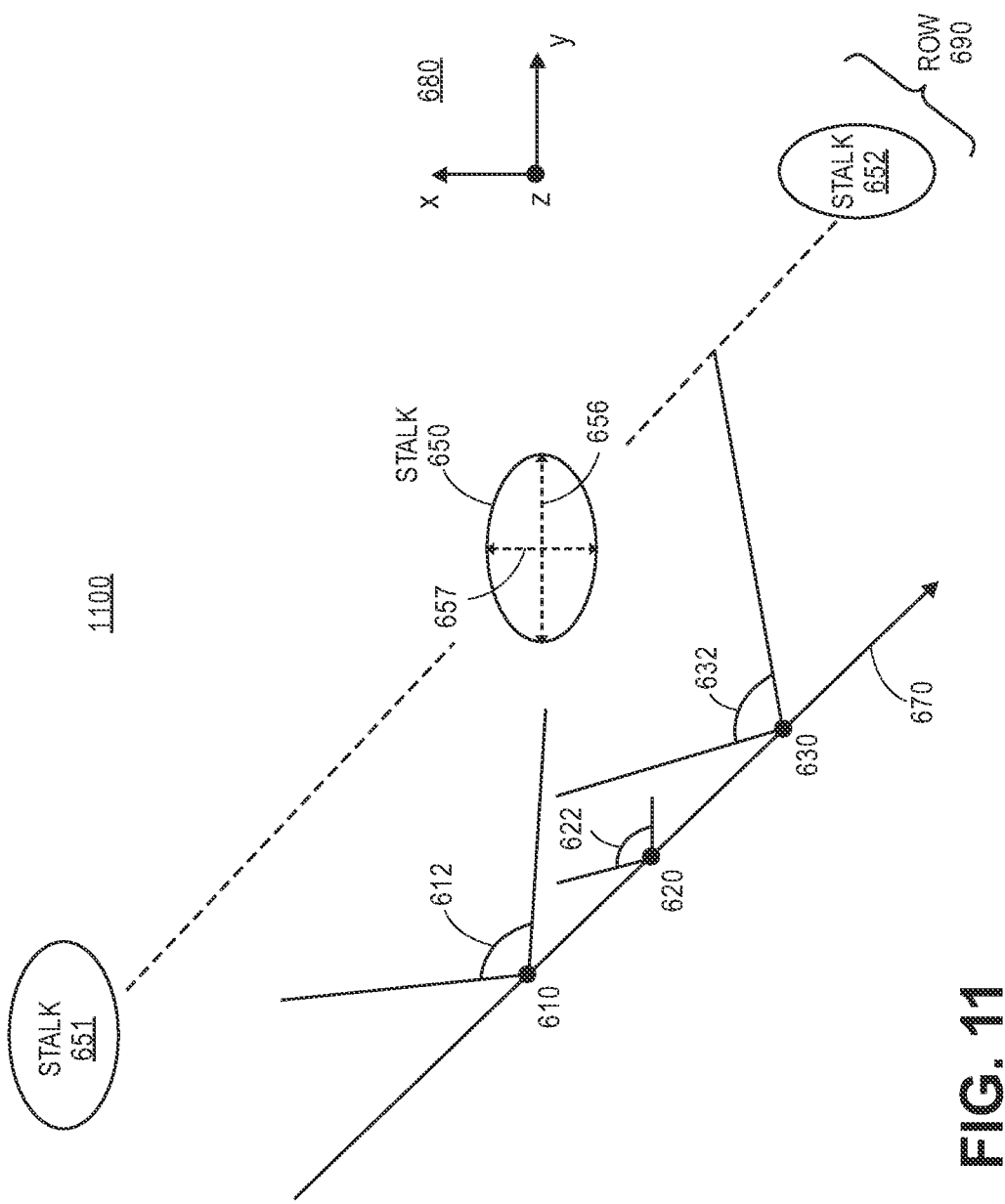
FIG. 11 illustrates a diagram for capturing images of a crop from multiple view points in accordance with one embodiment.

FIG. 11 illustrates a diagram 1100 for capturing images of a crop from multiple view points in accordance with one embodiment. Images are captured with processing logic that may comprise hardware (circuitry, dedicated logic, etc.), software (such as is run on a general purpose computer system or a dedicated machine or a device), or a combination of both. In one embodiment, the processing logic of at least one computer system (e.g., computer system 130, computer system 400, field manager computing device 104, cab computer 115, application controller 114, remote sensor 112 (e.g., image sensor, image capturing device), drone, self-guided device, robot, self-propelled device, etc.) captures images while moving along a direction 670 from that is substantially parallel with a row of a crop having stalks 650-652. The computer system executes instructions of a software application or program with processing logic. The software application or program can be initiated by the computer system.

An initiated software application (e.g., image capture software application, field application) of the computer system captures images of the field including stalks 650-652. In one example, images can be captured from different viewpoints (e.g., for each stalk of a row 690). For the stalk 650, one or more images are captured at each view point 610, 620, and 630. Images captured at each view point have a respective angle of view 610, 620, and 630. In one example, each angle of view is approximately 90-120 degrees (e.g., 95-105 degrees). An image of the stalk 650 that is captured at view point 630 will capture a larger portion of the stalk 650 than images of the stalk 650 that are captured at view points 620 and 610 because the view point 630 captures a larger portion (or all) of the stalk 650. The stalk 650 is approximately centered within the angle of view 632. A line drawn from the view point 630 to a center of the stalk 650 is approximately perpendicular with respect to the path 670. The stalk width measured using such methods may be used, for example, to estimate a growth stage, relative growth stage, yield potential or ear potential for each plant.

A high frequency of images are captured from different side view points in order to obtain an estimate of stalk orientation (e.g., along an oblong length (e.g., major axis 656) of the stalk, along a shorter length (e.g., minor axis 657)) and dimensions along major and minor axes of the cross-sectional area of a stalk. In one example, the stalk 650 has a major axis along a y-axis of a coordinate system 680, a minor axis along an x-axis, and grows vertical along a z-axis.

The computer system may be integrated with or coupled to an apparatus that performs an application pass (e.g., planting, tillage, fertilization). Alternatively, the computer system may be integrated with a remote sensor (e.g., remote sensor 112, drone, image capture device) associated with the apparatus that captures images during the application pass. The source of images during any pass could be a remote sensor (e.g., drone with a camera) that is instructed to track (e.g., lead or follow) the apparatus making the field pass. In another example, a user walks through a field and captures images with a mobile device or tablet device having an image capture device (e.g., camera) and the software application. In another example, a user guides an apparatus (e.g., apparatus with wheels and support frame for positioning image capture devices) having at least one image capture device through a field for capturing images. In another example, a self-guided or self-propelled device or robot moves through a field for capturing images with the software application. The software application controls whether images are captured continuously or during time periods of more stable movement as opposed to unstable movement.

ADDITIONAL EXAMPLES

Illustrative examples of the technologies disclosed herein are provided below. An embodiment of the technologies may include any at least one, and any combination of, the examples described below.

In an example 1, a computer system includes one or more processors in data communication with one or more sensors that are coupled to an agricultural machine configured to interact with soil; one or more non-transitory computer-readable storage media storing sequences of program instructions which, when executed by the one or more processors, cause the one or more processors to: obtain, from a database that stores agricultural image data, a plurality of images of at least one stage of crop development, the plurality images captured by a mobile image capture device while the mobile image capture device moves along a path of a field, the plurality of images including at least a first image of a crop captured with the mobile image capture device at a first angle of view of at least 90 degrees at a first viewpoint along the path of the field and a second image of the crop captured at a second angle of view of at least 90 degrees with the mobile image capture device at a second viewpoint along the path of the field; analyze the captured images, to determine relevant images that indicate a change in at least one condition of the crop development, and to generate a localized view map layer for viewing the field at the at least one stage of crop development based on at least the relevant captured images.

An example 2 includes the subject matter of example 1, wherein the instructions, when executed by the one or more processors, cause the one or more processors to generate yield data including a yield map to be displayed on a graphical user interface and to receive a user selection of a region of the yield map.

An example 3 includes the subject matter of example 1 or example 2, wherein the instructions, when executed by the one or more processors, cause the one or more processors to generate a localized view map layer that is geographically associated with the selected region of the field map in response to the user selection.

An example 4 includes the subject matter of example 3, wherein the instructions, when executed by the one or more processors, cause the one or more processors to execute instructions to superimpose the localized view map layer with the yield map.

An example 5 includes the subject matter of example 3, wherein the instructions, when executed by the one or more processors, cause the one or more processors to identify regions that are predicted to have a higher yield potential and regions predicted to have a lower yield potential.

An example 6 includes the subject matter of example 1 or example 2, wherein the instructions, when executed by the one or more processors, cause the one or more processors to perform, with an apparatus, an application pass for a field and at the same time capturing images of the field including crops if visible during the application pass; generate a localized view for viewing the field during the application pass based on the captured images; automatically analyze the application pass including at least one of a planting analysis, a fertilizer analysis, a harvesting analysis, and a tillage analysis based on the images captured during the application pass.

An example 7 includes the subject matter of example 6, wherein the instructions, when executed by the one or more processors, cause the one or more processors to adjust, with the apparatus or an agricultural computer system in communication with the apparatus, settings of the application pass if appropriate based on the analysis of the images captured during the application pass.

An example 8 includes the subject matter of example 6, wherein the application pass comprises a planting application pass and the planting analysis includes determining current field conditions from the captured images, wherein this planting analysis causes an adjustment to parameters of the apparatus during the application pass.

An example 9 includes the subject matter of example 6, wherein the application pass comprises a fertilizer application pass and a remote sensor leads the apparatus to gather images of the crops ahead of the apparatus, determines a crop health criterion based on the captured images as part of the fertilizer analysis, and then adjusts settings automatically including adjusting an application rate for the fertilizer based on the crop health criterion.

An example 10 includes the subject matter of example 6, wherein the application pass comprises a harvesting application pass and the harvesting analysis includes identifying crop components in a crop processing device and identifying size and health of the crop component.

An example 11 includes the subject matter of example 6, wherein the application pass comprises a tillage application pass and the tillage analysis includes residue analysis of soil after the application pass.

An example 12 includes the subject matter of example 1 or example 2, wherein the instructions, when executed by the one or more processors, cause the one or more processors to determine location information, orientation information of the data processing system, time information, shadow information, and crop row information and associate this information with a captured image of the plurality of captured images; analyze the captured image and the information associated with the images for determining a plant area, a shadow area, and different characteristics of the crop.

An example 13 includes the subject matter of example 12, wherein the different characteristics of the crop include location of a stalk or stem in the field.

An example 14 includes the subject matter of example 12, wherein the different characteristics of the crop include a relative size of a crop in comparison to neighboring crops to determine a relative growth stage, leaf size, leaf length, number of leaves for each stalk or stem, and a location of a top of a stalk or stem.

An example 15 includes the subject matter of example 12, wherein the instructions, when executed by the one or more processors, cause the one or more processors to generate and cause a graphical user interface to display different characteristics of the crop; identify any crop issues if the crop characteristics indicate or predict a lower yield than other regions.

An example 16 includes the subject matter of example 1 or example 2, wherein the computer system is coupled to an agricultural apparatus and the instructions, when executed by the one or more processors, cause the one or more processors to: access memory storing agricultural image data including images of at least one stage of crop development that are captured with a remote sensor moving through a field; analyze the captured images, to determine relevant images that indicate a change in at least one condition of the crop development, and to generate a localized view map layer for viewing the field at the at least one stage of crop development based on at least the relevant captured images.

An example 17 includes the subject matter of example 16, wherein the instructions, when executed by the one or more processors, cause the one or more processors to generate yield data including a yield map to be displayed on a graphical user interface and to receive a user selection of a region of the yield map.

An example 18 includes the subject matter of example 17, wherein the instructions, when executed by the one or more processors, cause the one or more processors to generate a localized view map layer that is geographically associated with the selected region of the field map in response to the user selection.

An example 19 includes the subject matter of example 18, wherein the instructions, when executed by the one or more processors, cause the one or more processors to identify regions that are predicted to have a higher yield potential and regions predicted to have a lower yield potential.

An example 20 includes the subject matter of example 16, wherein the agricultural image data includes images of at least one stage of crop development including multiple viewpoints of each stalk in order to determine a growth stage, a relative growth stage, yield potential or ear potential for each stalk.

In an example 21, a computer-implemented method includes obtaining, from a database that stores agricultural image data, a plurality of images of at least one stage of crop development, the plurality images captured by a mobile image capture device while the mobile image capture device moves along a path of a field, the plurality of images including at least a first image of a crop captured with the mobile image capture device at a first angle of view of at least 90 degrees at a first viewpoint along the path of the field and a second image of the crop captured at a second angle of view of at least 90 degrees with the mobile image capture device at a second viewpoint along the path of the field; analyzing the captured images, to determine relevant images that indicate a change in at least one condition of the crop development, and to generate a localized view map layer for viewing the field at the at least one stage of crop development based on at least the relevant captured images.

An example 22 includes the subject matter of example 21, and includes generating yield data including a yield map to be displayed on a graphical user interface; receiving a user selection of a region of the yield map.

An example 23 includes the subject matter of example 21 or example 22, and includes generating a localized view map layer that is geographically associated with the selected region of the field map in response to the user selection.

An example 24 includes the subject matter of example 23, and includes superimposing the localized view map layer with the yield map.

An example 25 includes the subject matter of example 23, and includes identifying regions that are predicted to have a higher yield potential; identifying regions predicted to have a lower yield potential.

An example 26 includes the subject matter of example 21 or example 22, and includes performing, with an apparatus, an application pass for a field and at the same time capturing images of the field including crops if visible during the application pass; generating a localized view for viewing the field during the application pass based on the captured images; automatically analyzing the application pass including at least one of a planting analysis, a fertilizer analysis, a harvesting analysis, and a tillage analysis based on the images captured during the application pass.

An example 27 includes the subject matter of example 26, and includes adjusting, with the apparatus or an agricultural computer system in communication with the apparatus, one or more settings of the application pass if appropriate based on the analysis of the images captured during the application pass.

An example 28 includes the subject matter of example 26, wherein the application pass comprises a planting application pass and the planting analysis includes determining current field conditions from the captured images, wherein the planting analysis causes an adjustment to parameters of the apparatus during the application pass.

An example 29 includes the subject matter of example 26, wherein the application pass comprises a fertilizer application pass and a remote sensor leads the apparatus to gather images of the crops ahead of the apparatus, determines a crop health criterion based on the captured images as part of the fertilizer analysis, and then adjusts settings automatically including adjusting an application rate for the fertilizer based on the crop health criterion.

An example 30 includes the subject matter of example 26, wherein the application pass comprises a harvesting application pass and the harvesting analysis includes identifying crop components in a crop processing device and identifying size and health of the crop component.

An example 31 includes the subject matter of example 26, wherein the application pass comprises a tillage application pass and the tillage analysis includes residue analysis of soil after the application pass.

An example 32 includes the subject matter of example 21 or example 22, and includes determining location information, orientation information of the data processing system, time information, shadow information, and crop row information and associate this information with a captured image of the plurality of captured images; analyzing the captured image and the information associated with the images for determining a plant area, a shadow area, and different characteristics of the crop.

An example 33 includes the subject matter of example 32, wherein the different characteristics of the crop include location of a stalk or stem in the field.

An example 34 includes the subject matter of example 32, wherein the different characteristics of the crop include a relative size of a crop in comparison to neighboring crops to determine a relative growth stage, leaf size, leaf length, number of leaves for each stalk or stem, and a location of a top of a stalk or stem.

An example 35 includes the subject matter of example 32, and includes generating and causing a graphical user interface to display different characteristics of the crop; identifying any crop issues if the crop characteristics indicate or predict a lower yield than other regions.

An example 36 includes the subject matter of example 21 or example 22, and includes accessing memory storing agricultural image data including images of at least one stage of crop development that are captured with a remote sensor moving through a field; analyzing the captured images, to determine relevant images that indicate a change in at least one condition of the crop development, and to generate a localized view map layer for viewing the field at the at least one stage of crop development based on at least the relevant captured images.

An example 37 includes the subject matter of example 36, and includes generating yield data including a yield map to be displayed on a graphical user interface; receiving a user selection of a region of the yield map.

An example 38 includes the subject matter of example 37, and includes generating a localized view map layer that is geographically associated with the selected region of the field map in response to the user selection.

An example 39 includes the subject matter of example 38, and includes identifying regions that are predicted to have a higher yield potential and regions predicted to have a lower yield potential.

An example 40 includes the subject matter of example 36, wherein the agricultural image data includes images of at least one stage of crop development including multiple viewpoints of each stalk in order to determine a growth stage, a relative growth stage, yield potential or ear potential for each stalk.

GENERAL CONSIDERATIONS

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A system for adjusting settings of a field apparatus during a pass through an agricultural field, the system comprising:
one or more processors;
one or more non-transitory computer-readable storage media storing instructions which, when executed by the one or more processors, cause the one or more processors to perform operations comprising:
capturing a plurality of digital images of a portion of the agricultural field during the pass of the agricultural field by the field apparatus, the plurality of digital images captured by a mobile image capture device and the pass including a planting application pass through the agricultural field, and a tillage application pass through the agricultural field;
generating a localized view map of the agricultural field based at least in part on the plurality of digital images for viewing the agricultural field during the pass;
performing an image analysis, wherein the image analysis comprises analyzing the plurality of digital images to determine at least one condition of the agricultural field, the at least one condition of the agricultural field including a soil moisture condition of the agricultural field;
performing a tillage analysis during the tillage application pass, wherein the tillage analysis further comprises a soil residue analysis after the planting application pass; and
adjusting one or more settings of the field apparatus during the pass of the agricultural field, based on the image analysis of the plurality of digital images and the tillage analysis, the one or more settings including a speed and/or a downforce of the field apparatus.

2. The system of claim 1, wherein the instructions, when executed by the one or more processors, cause the one or more processors to display the localized view map on a graphical user interface of a user device such that the captured digital images are viewable during the pass.

3. The system of claim 1, wherein the mobile image capture device is coupled to the field apparatus.

4. The system of claim 1, wherein the mobile image capture device comprises a field manager computer device, a sensor, a drone, a self-guided device, or a self-propelled device.

5. The system of claim 1, wherein the image analysis occurs in real-time as the field apparatus performs the pass.

6. The system of claim 1, wherein the image analysis is performed by a computing system that is part of the field apparatus or is coupled to the field apparatus.

7. The system of claim 1, wherein the image analysis is performed by an agricultural system, which is remote from the field apparatus and is in communication with the field apparatus.

8. The system of claim 1, wherein the localized view map is created by, for each image of the plurality of captured digital images, determining location information, orientation information, time information, and crop row information associated with the captured digital image, and determining a crop characteristic based on an analysis of the plurality of digital images and the location information, orientation information, time information, and crop row information associated with each of the plurality of captured digital images.

9. The system of claim 8, wherein the instructions, when executed by the one or more processors, cause the one or more processors to display a graphical user interface of the localized view map superimposed with an agronomic information layer, the agronomic information layer comprising a yield map that identifies at least one of a high yield region or a low yield region of the agricultural field, a planting population map, a seed spacing map, a planting downforce map, or a field health map.

10. The system of claim 9, wherein the instructions, when executed by the one or more processors, cause the one or more processors to display on the graphical user interface a portion of the agronomic information layer that identifies a characteristic of a particular high yield region of the agricultural field.

11. The system of claim 10, wherein the instructions, when executed by the one or more processors, cause the one or more processors to display on the graphical user interface a portion of the agronomic information layer that identifies a characteristic of a particular low yield region of the agricultural field.

12. The system of claim 1, wherein the plurality of digital images is captured by the mobile capture device during a pass by a field apparatus that is configured to interact with soil.

13. The system of claim 12, wherein the localized view map is created by automatically performing analyzing the plurality of digital images in real-time during the pass.

14. A computer-implemented method for adjusting settings of a field apparatus during a pass through an agricultural field, the method comprising:
capturing a plurality of digital images of a portion of the agricultural field during the pass of the agricultural field by the field apparatus, the plurality of digital images captured by a mobile image capture device and the pass including a planting application pass through the agricultural field, and a tillage application pass through the agricultural field;
generating a localized view map of the agricultural field based at least in part on the plurality of captured digital images for viewing the agricultural field during the pass;
performing an image analysis, wherein the image analysis comprises analyzing the plurality of digital images to determine at least one condition of the agricultural field, the at least one condition of the agricultural field including a soil moisture condition of the agricultural field;
performing a tillage analysis during the tillage application pass, wherein the tillage analysis further comprises a soil residue analysis after the planting application pass; and
adjusting one or more settings of the field apparatus during the pass of the agricultural field, based on the image analysis of the plurality of digital images and the tillage analysis, the one or more settings including a speed and/or a downforce of the field apparatus.

15. The method of claim 14, further comprising causing a graphical user interface of a user device to display the localized view map such that the plurality of captured digital images are viewable during the pass.

16. The method of claim 14, wherein the mobile image capture device is coupled to the field apparatus.

17. The method of claim 14, wherein the mobile image capture device comprises a field manager computing device, a sensor, a drone, a self-guided device, or a self-propelled device.

18. The method of claim 14, wherein the image analysis occurs in real-time as the field apparatus performs the pass.

19. The method of claim 14, wherein the image analysis is performed by a computing system that is part of the field apparatus or is coupled to the field apparatus.

20. The method of claim 14, wherein the image analysis is performed by an agricultural system, which is remote from the field apparatus and is in communication with the field apparatus.

21. The method of claim 14, wherein the localized view map is created by, for each image of the plurality of captured digital images, determining location information, orientation information, time information, and crop row information associated with the captured digital image, and determining a crop characteristic based on an analysis of the plurality of digital images and the location information, orientation information, time information, and crop row information associated with each of the plurality of captured digital images.

22. The method of claim 15, further comprising displaying on the graphical user interface the localized view map superimposed with an agronomic information layer, the agronomic information layer comprising a yield map that identifies at least one of a high yield region or a low yield region of the agricultural field, a planting population map, a seed spacing map, a planting downforce map, or a field health map.

23. The method of claim 22, further comprising displaying on the graphical user interface a portion of the agronomic information layer that identifies a characteristic of a particular high yield region of the agricultural field.

24. The method of claim 23, further comprising displaying on the graphical user interface a portion of the agronomic information layer that identifies a characteristic of a particular low yield region of the agricultural field.

25. The method of claim 14, wherein the plurality of digital images is captured by the mobile image capture device during a pass by an agricultural machine configured to interact with soil.

26. The method of claim 25, wherein the localized view map is created by automatically performing an image analysis on the plurality of digital images in real-time during the pass.

* * * * *